US009392610B2

(12) United States Patent
Jung et al.

(10) Patent No.: US 9,392,610 B2
(45) Date of Patent: Jul. 12, 2016

(54) OPERATING METHOD FOR ACQUIRING SYSTEM INFORMATION IN WIRELESS COMMUNICATION SYSTEM, AND APPARATUS FOR SUPPORTING SAME

(71) Applicant: LG ELECTRONICS INC., Seoul (KR)

(72) Inventors: Sunghoon Jung, Seoul (KR); Youngdae Lee, Seoul (KR); Sungjun Park, Seoul (KR); Seungjune Yi, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/426,325

(22) PCT Filed: Sep. 13, 2013

(86) PCT No.: PCT/KR2013/008316
§ 371 (c)(1),
(2) Date: Mar. 5, 2015

(87) PCT Pub. No.: WO2014/042468
PCT Pub. Date: Mar. 20, 2014

(65) Prior Publication Data
US 2015/0223258 A1 Aug. 6, 2015

Related U.S. Application Data

(60) Provisional application No. 61/700,846, filed on Sep. 13, 2012.

(51) Int. Cl.
*H04W 72/08* (2009.01)
*H04W 48/12* (2009.01)
(Continued)

(52) U.S. Cl.
CPC ............ *H04W 72/082* (2013.01); *H04W 48/10* (2013.01); *H04W 48/12* (2013.01); *H04W 76/027* (2013.01); *H04W 88/02* (2013.01)

(58) Field of Classification Search
USPC ........................ 455/452.1, 423; 370/328, 329
See application file for complete search history.

(56) References Cited

U.S. PATENT DOCUMENTS

2011/0019532 A1* 1/2011 Jung ................... H04W 76/028
370/216
2011/0039546 A1* 2/2011 Narasimha ........ H04W 36/0055
455/423

(Continued)

FOREIGN PATENT DOCUMENTS

KR 10-2005-0075091 7/2005
KR 10-2009-0029674 3/2009

(Continued)

OTHER PUBLICATIONS

PCT International Application No. PCT/KR2013/008316, Written Opinion of the International Searching Authority dated Dec. 27, 2013, 1 page.

*Primary Examiner* — Nathan Taylor
(74) *Attorney, Agent, or Firm* — Lee, Hong, Degerman, Kang & Waimey; Jonathan Kang; Richard Salfelder

(57) ABSTRACT

Provided is an operating method for acquiring system information which is to be performed by a terminal in a wireless communication system. The method comprises: transmitting, to a serving cell, a system information acquisition failure report message that requests the transmission of compulsory system information; operating a system based on the acquired compulsory system information upon the acquisition of the compulsory system information as a response to the system information acquisition failure report message; and performing a connection recovery upon the failure of the acquisition of the compulsory system information as a response to the system information acquisition failure report message.

9 Claims, 13 Drawing Sheets

(51) Int. Cl.
  *H04W 48/10* (2009.01)
  *H04W 76/02* (2009.01)
  *H04W 88/02* (2009.01)

(56) References Cited

U.S. PATENT DOCUMENTS

| | | | | | |
|---|---|---|---|---|---|
| 2014/0328329 | A1* | 11/2014 | Novlan | ............... | H04W 72/042 370/336 |
| 2015/0109918 | A1* | 4/2015 | Sharma | ............ | H04W 36/0055 370/230 |
| 2015/0173089 | A1* | 6/2015 | Baghel | ............... | H04W 72/082 370/329 |
| 2015/0223258 | A1* | 8/2015 | Jung | ..................... | H04W 48/12 455/452.1 |
| 2015/0281991 | A1* | 10/2015 | Jung | ................... | H04W 73/027 370/329 |
| 2015/0296526 | A1* | 10/2015 | Behravan | .............. | H04W 16/14 370/329 |
| 2015/0319744 | A1* | 11/2015 | Jung | ..................... | H04W 24/10 370/328 |
| 2015/0373506 | A1* | 12/2015 | Jung | ..................... | H04L 12/189 370/312 |

FOREIGN PATENT DOCUMENTS

| | | |
|---|---|---|
| KR | 10-2012-0048634 | 5/2012 |
| KR | 10-2012-0091311 | 8/2012 |

* cited by examiner

OPERATING METHOD FOR ACQUIRING SYSTEM INFORMATION IN WIRELESS COMMUNICATION SYSTEM, AND APPARATUS FOR SUPPORTING SAME

CROSS-REFERENCE TO RELATED APPLICATIONS

This application is the National Stage filing under 35 U.S.C. 371 of International Application No. PCT/KR2013/008316, filed on Sep. 13, 2013, which claims the benefit of U.S. Provisional Application Ser. No. 61/700,846, filed on Sep. 13, 2012, the contents of which are hereby incorporated by reference herein in their entirety.

BACKGROUND OF THE INVENTION

1. Field of the Invention

The present invention relates to wireless communication and, more particularly, to an operating method for acquiring system information in a wireless communication system and an apparatus for supporting the same.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

In the wireless communication system, cells such as a micro cell, a femto cell, and a pico cell having small coverage have been developed in a macro cell having wide coverage. In this way, a network environment to provide wireless coverage because various access nodes such as a macro cell, a micro cell, a pico cell, and/or a femto cell have been developed in the wireless communication network, refers to a Heterogeneous Network (HetNet).

Interference may occur in a coverage boundary of a small cell such as a femto cell or a pico cell in a macro cell coverage in the HetNet environment. In order to improve coverage extension of small cells and service quality in a boundary point by taking into consideration the above characteristic, a specific radio resource is allocated and used so that influence of the interference may be reduced. In order to attenuate or avoid the interference, a radio resource set by a network may refer to a restricted measurement resource.

It is difficult to transmit system information necessary for an operation of the terminal through a specific radio resource because of the above characteristic. The terminal may not normally acquire the system information due to a cause such as the interference. Accordingly, there is a need for an operating method capable of acquiring system information required by the terminal to be operated.

SUMMARY OF THE INVENTION

The present invention provides an operating method for acquiring system information in a wireless communication system and an apparatus for supporting the same.

In an aspect, an operating method for acquiring system information which is to be performed by a terminal in a wireless communication system is provided. The method comprises transmitting to a serving cell, a system information acquisition failure report message that requests the transmission of compulsory system information, operating a system based on the acquired compulsory system information upon the acquisition of the compulsory system information as a response to the system information acquisition failure report message and performing a connection recovery upon the failure of the acquisition of the compulsory system information as a response to the system information acquisition failure report message.

The method may further comprise starting a timer according to the transmission of the system information acquisition failure report message. The compulsory system information may be acquired before the timer is terminated. The method may further comprise determining that the acquisition of the compulsory system information is acquired when the compulsory system information is not acquired until the timer is terminated.

The compulsory system information may be transmitted from the serving cell through dedicated signaling.

The terminal may receive allocation of a low interference radio resource from a network to avoid interference. The compulsory system information transmitted through the dedicated signaling may be transmitted on the low interference radio resource.

The method may further comprise stopping the timer when acquiring the system information or the compulsory system information from the serving cell during drive of the timer.

The method may further comprise attempting broadcasted system information from the serving cell. The system information acquisition failure report message may be transmitted when the terminal does not acquire the broadcasted system information from the serving cell.

The performing of the connection recovery may comprise performing a radio resource control (RRC) connection reestablishment process with a selected cell.

The selected cell may be a cell different from the serving cell.

The selected cell may be a cell which is operated in a frequency different from a frequency of the serving cell.

The performing of the connection recovery may comprise releasing connection with the serving cell and entering a Radio Resource Control (RRC) idle state.

The compulsory system information may comprise a master information block (MIB), a system information block 1 (SIB1), and a system information block 2 (SIB2) among the system information of the serving cell.

In another aspect, a wireless apparatus operating in a wireless communication system is provided. The wireless apparatus comprises a Radio Frequency (RF) unit that sends and receives radio signals and a processor that is functionally coupled to the RF unit and operates. The processor is configured to transmit to a serving cell, a system information acquisition failure report message that requests the transmission of compulsory system information, operate a system based on the acquired compulsory system information upon the acquisition of the compulsory system information as a response to the system information acquisition failure report message and perform a connection recovery upon the failure of the acquisition of the compulsory system information as a response to the system information acquisition failure report message.

The operating method for acquiring system information in a wireless communication system may provide compulsory system information through report/request of the terminal in a network environment in which a restricted measurement resource may be set. Accordingly, the terminal may minimize a service impossible state due to the failure of the acquisition of the system information. Since the compulsory system information may be provided through dedicated signaling according to report/request of the terminal, consumption of a radio resource due to provision of imprudent compulsory system information may be prevented. Further, although acquisition of the system information by broadcasting fails, when the system information may be acquired through dedicated signaling, a situation where the terminal is separated from a cell may be prevented. Continuity of a service provided to the terminal may maintain by operating the terminal, and a network operation may be efficiently achieved.

DESCRIPTION OF EXEMPLARY
EMBODIMENTS

Figure 1:
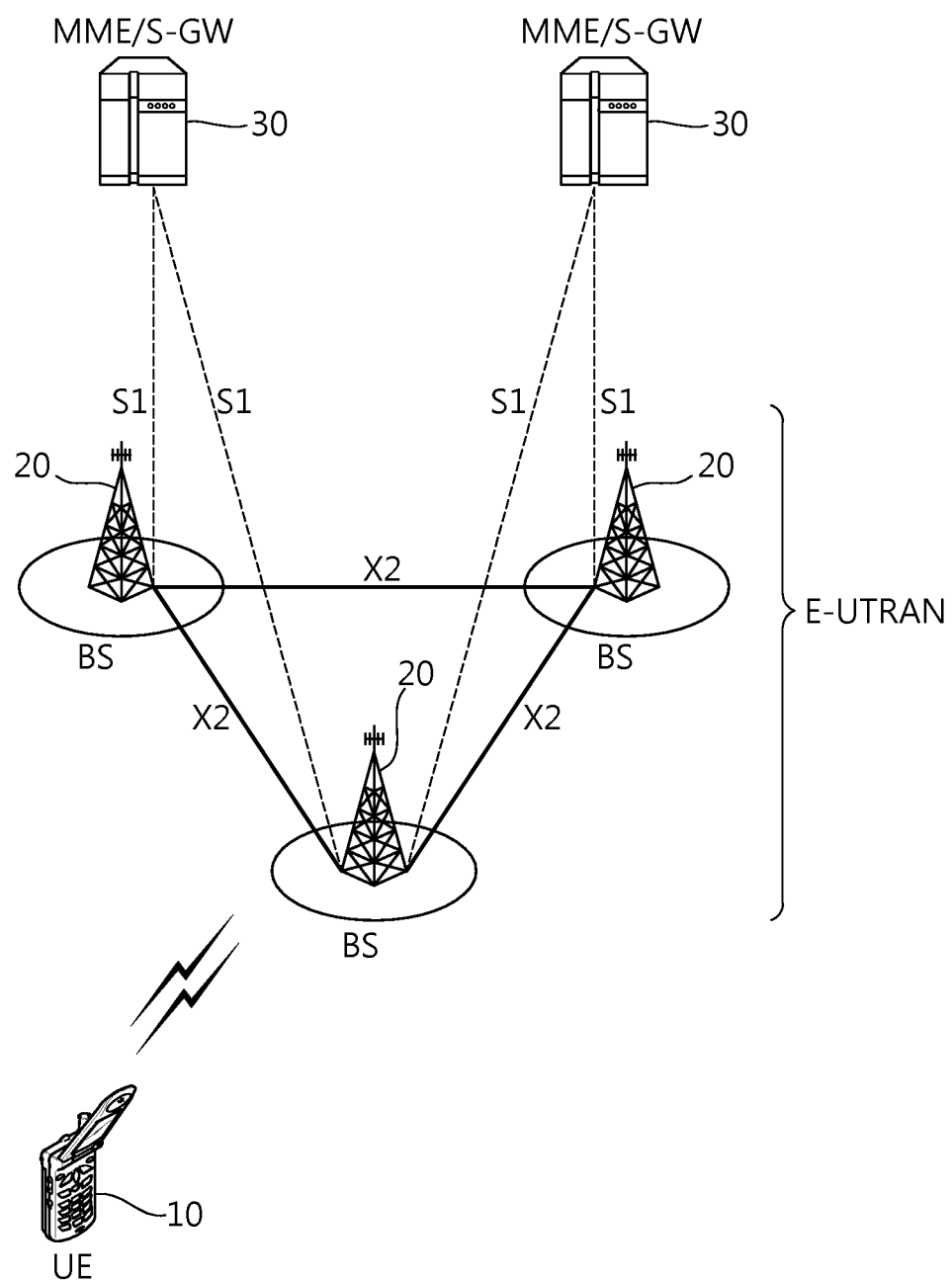
FIG. 1 illustrates a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
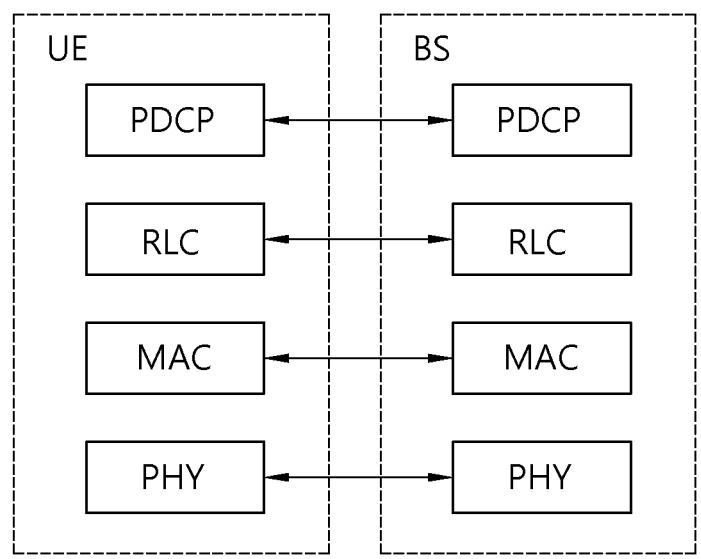
FIG. 2 is a block diagram showing the structure of a wireless protocol on the user plane.
Figure 3:
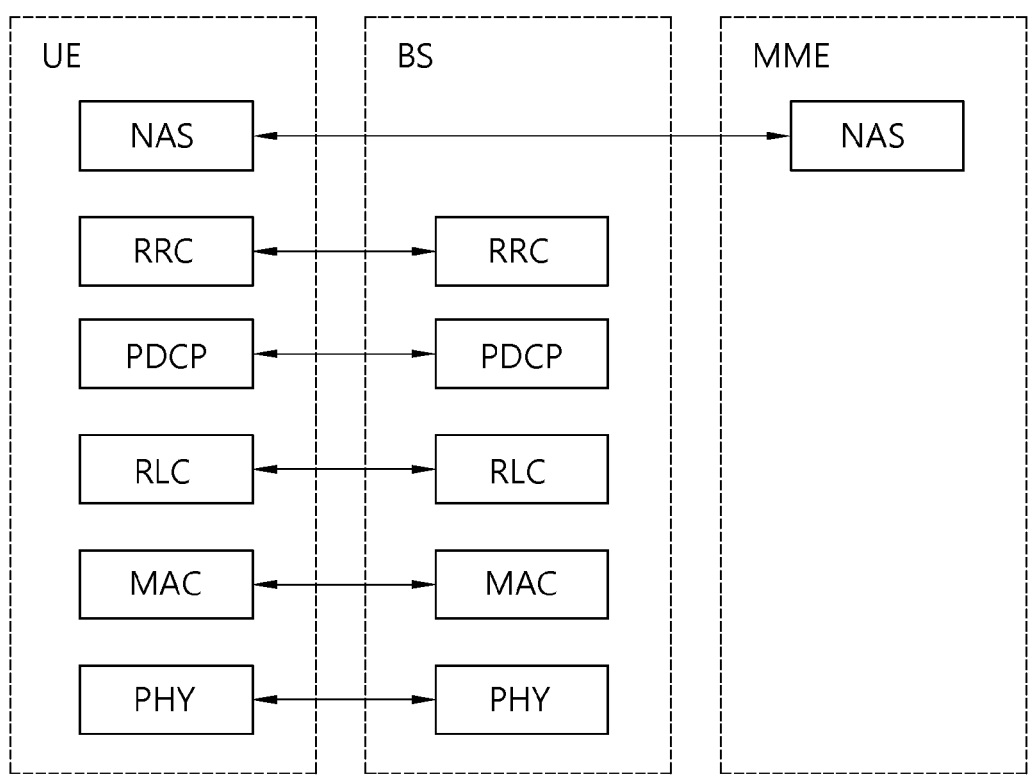
FIG. 3 is a block diagram showing the structure of a wireless protocol on the control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into Master Information Block (MIB) and a plurality of System Information Blocks (SIBs).

The MIB may include the limited number of compulsory parameters which are most often transmitted and requested to be obtained for other information from a cell. The terminal firstly searches the MIB after downlink synchronization. The MIB may include information to support downlink channel bandwidth, PHICH setting, and synchronization, and SFN and eNB transmission antenna setting operated as a timing reference. The MIB may be broadcasted and transmitted on a BCH.

SIB1 (SystemInformationBlockType1) among the above SIBs is included in a "SystemInformationBlockType1" message to be transmitted. Other SIBs except for the SIB1 are included in the system information message to be transmitted. The SIBs may be flexibly mapped to the system information message according to a scheduling information list parameter included in the SIB1. However, each SIB is included in a single system information message. Only SIBs having only the same scheduling required value (e.g. period) may be mapped to the same system information message. Further, a SIB2 (SystemInformationBlockType2) is always mapped to a system information message corresponding to a first entry in a system information message list of a scheduling information list. A plurality of system information messages may be transmitted within the same period. The SIBI and system information messages are transmitted on a DL-SCH.

Further to broadcast transmission, in an E-UTRAN, an SIB1 may become dedicated signaling including a parameter set similar to a preset value. In this case, the SIB1 may be transmitted while being included in a RRC connection reset message.

The SIB1 includes information associated with terminal cell access, and defines scheduling of other SIBs. The SIB1 may include PLMN identifiers, TAC (Tracking Area Code) and a cell ID of a network, a cell barring status indicating whether a cell may camp-on, a lowest reception level required in a cell used as a cell reselection reference, and information associated with transmission times and periods of other SIBs.

An SIB2 may include wireless resource configuration information commonly applied to all terminals. The SIB2 may include information on an uplink carrier frequency, a uplink channel bandwidth, RACH configuration, paging configuration, uplink power control configuration, Sounding Reference Signal configuration, PUCCH configuration and PUSCH configuration to support ACK/NACK transmission.

The terminal may apply acquisition and change detection process of the system information with respect to only the PCell. In the SCell, the E-UTRAN may provide all system information associated with RRC connection state operation through dedicated signaling when a corresponding SCell is added. When the system information associated with the configured SCell is changed, the E-UTRAN may release and add a considered SCell. This may be performed together with a single RRC connection reset message. The E-UTRAN may set broadcasted values and other parameters in a SCell through the dedicated signaling.

The terminal should ensure validity with respect to a specific type system information and the specific type system information is compulsory system information. Compulsory system information may be defined as follows.

When the terminal is in an RRC idle state: The terminal should ensure to have valid versions of the MIB and the SIB1 as well as SIB2 to SIB8. This may depend on support of an RAT.

When the terminal is in a RRC connection state: The terminal should ensure to have valid versions of MIB, SIB1, and SIB2.

In general, the validity of the system information should be ensured to a maximum three hours after acquisition.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
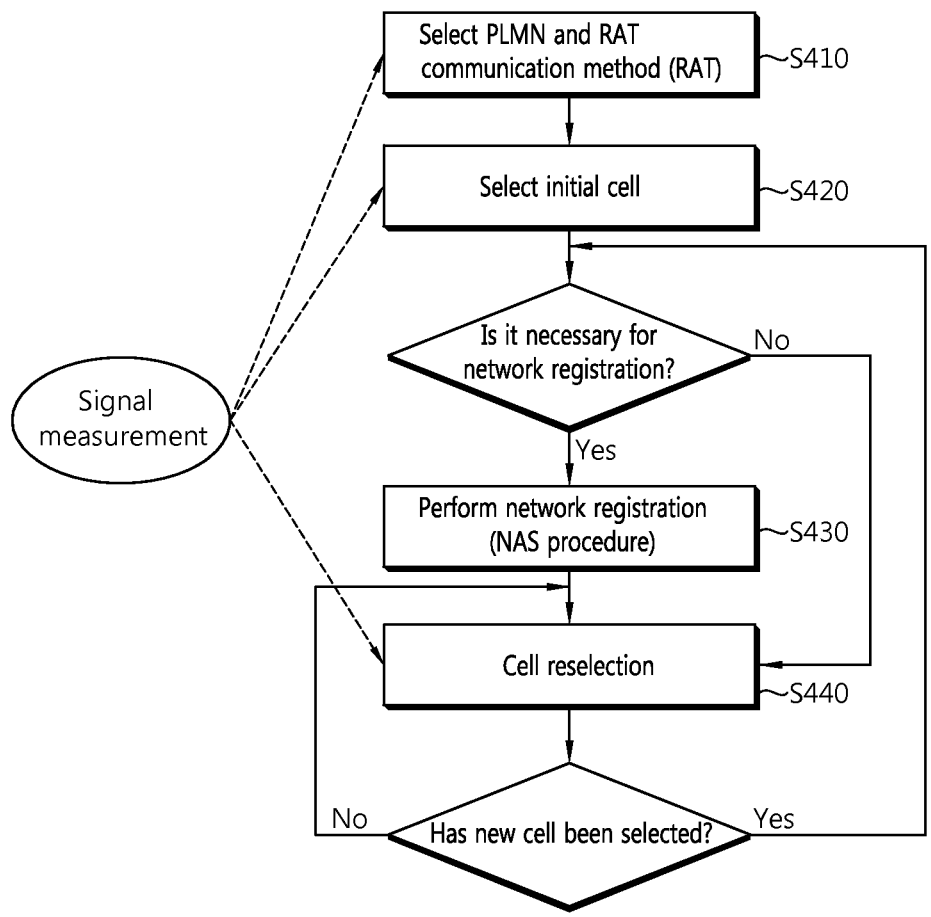
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
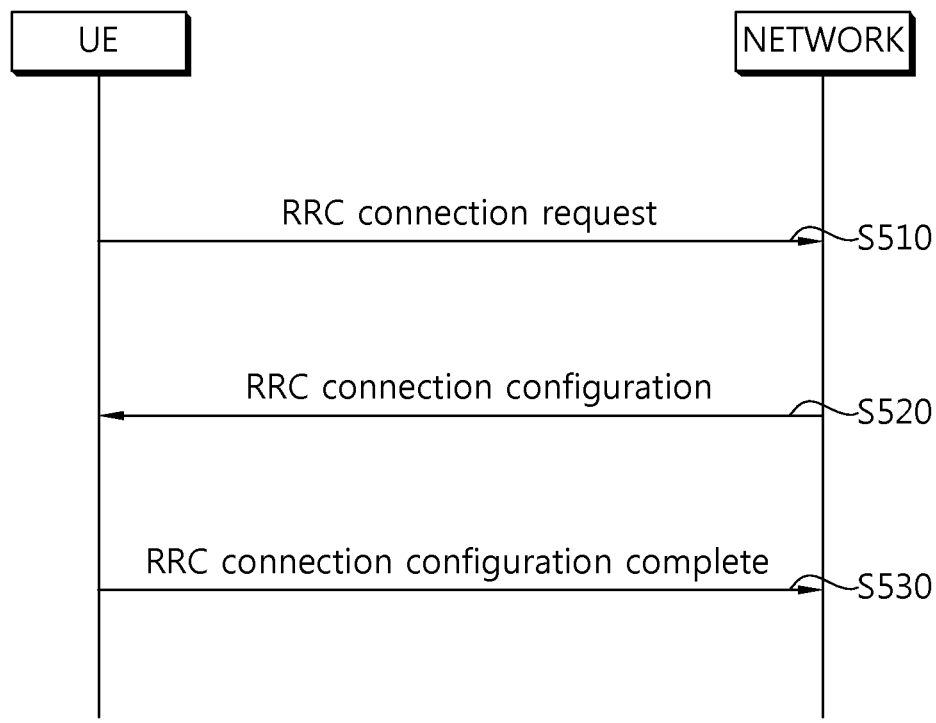
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
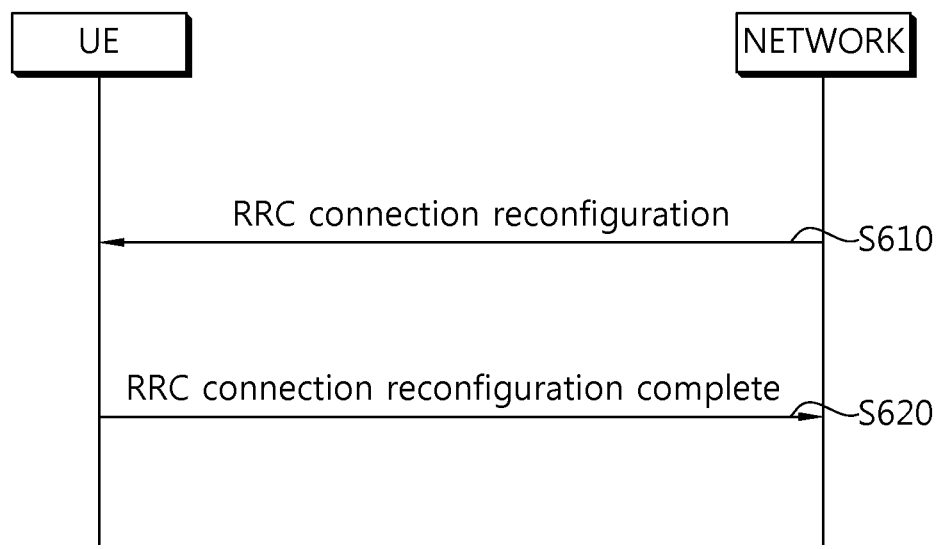
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_s = Q_{meas,s} + Q_{hyst}, R_n = Q_{meas,s} - Q_{offset}$$ [Equation 1]

In this case, $R_s$ is the ranking criterion of a serving cell, $R_n$ is the ranking criterion of a neighbor cell, $Q_{meas,s}$ is the quality value of the serving cell measured by UE $Q_{meas,n}$ is the quality value of the neighbor cell measured by UE, $Q_{hyst}$ is the hysteresis value for ranking, and $Q_{offset}$ is an offset between the two cells.

In Intra-frequency, if UE receives an offset "$Q_{offsets,n}$" between a serving cell and a neighbor cell, $Q_{offset} = Q_{offsets,n}$. If UE does not $Q_{offsets,n}$, $Q_{offset} = 0$.

In Inter-frequency, if UE receives an offset "$Q_{offsets,n}$" for a corresponding cell, $Q_{offset} = Q_{offsets,n} + Q_{frequency}$. If UE does not receive "$Q_{offsets,n}$", $Q_{offset} = Q_{frequency}$.

If the ranking criterion $R_s$ of a serving cell and the ranking criterion $R_n$ of a neighbor cell are changed in a similar state, ranking priority is frequency changed as a result of the change, and UE may alternately reselect the twos. $Q_{hyst}$ is a parameter that gives hysteresis to cell reselection so that UE is prevented from to alternately reselecting two cells.

UE measures Rs of a serving cell and $R_n$ of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Radio Link Monitoring (RLM) is described below.

UE monitors downlink quality based on a cell-specific reference signal in order to detect the quality of the downlink radio link of a PCell. The UE estimates the quality of a downlink radio link in order to monitor the quality of the downlink radio link of the PCell, and compares the estimated quality with threshold values Qout and Qin. The threshold value Qout is defined as a level at which a downlink radio link is unable to be stably received, which corresponds to a block error rate of 10% of hypothetical PDCCH transmission by taking into consideration a PDFICH error. The threshold value Qin is defined as a downlink radio link quality level at which a downlink radio link is able to be more stably received than compared to the level of Qout, which corresponds to a block error rate of 2% of hypothetical PDCCH transmission by taking into consideration a PDFICH error.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
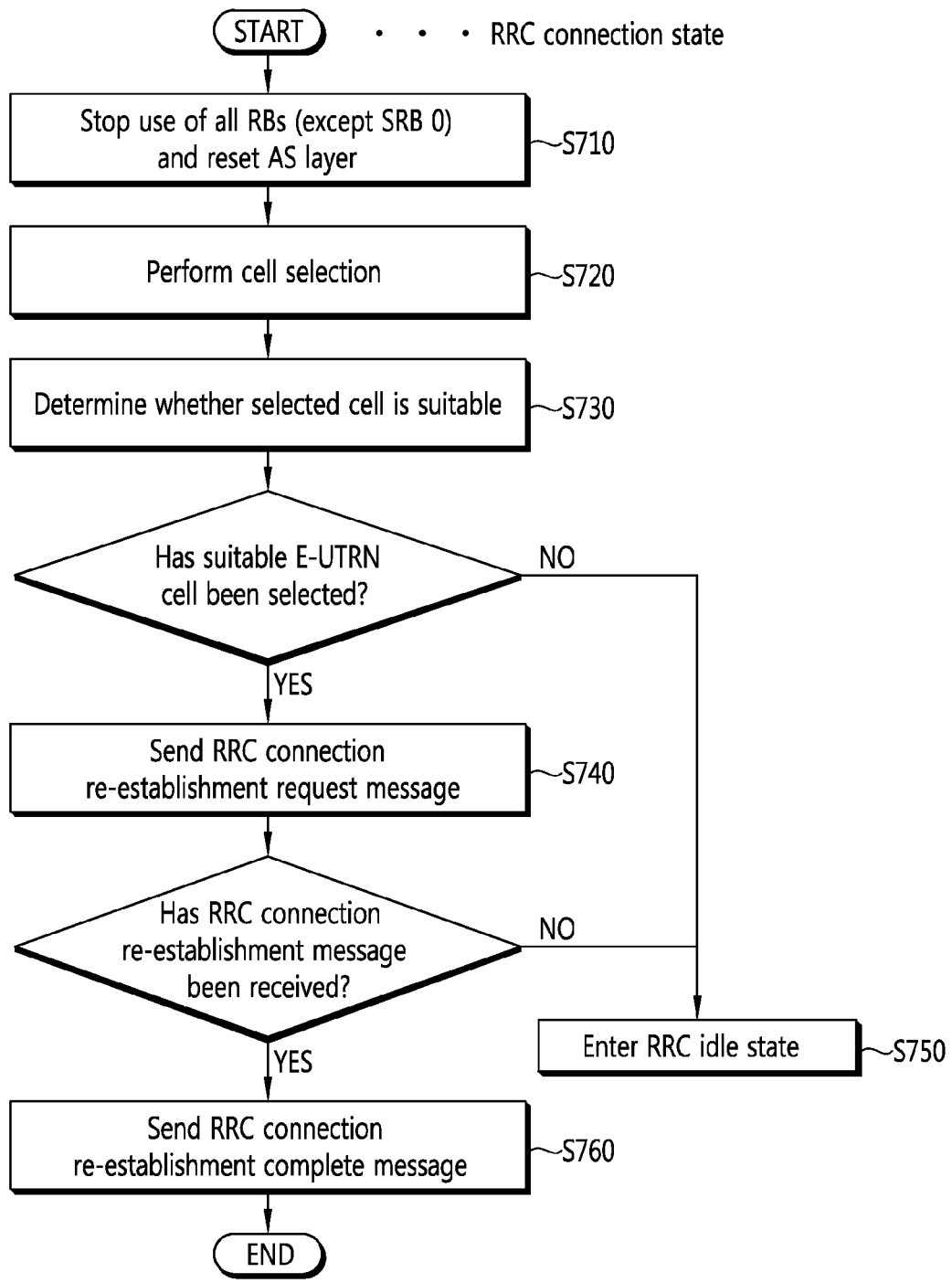
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

A report on an RLF is described below.

When an RLF occurs or a handover failure occurs, UE reports such a failure event to a network in order to support the Mobility Robustness Optimization (MRO) of the network.

After RRC connection re-establishment, the UE may provide the RLF report to the eNB. Wireless measurement includes in the RLF report may be used for a potential reason of a failure in order to identify coverage problems. Such information may be used to borrow such events as input to other algorithms by excluding the events in MRO evaluation for an intra-LTE mobility connection failure.

If RRC connection re-establishment fails or UE does not perform RRC connection re-establishment, the UE may be connected again in idle mode, and may generate a valid RLF report on an eNB. For such an object, the UE may store information related to the most recent RLF or handover failure, and may inform an LTE cell that an RLF report is valid every RRC connection (re)establishment and handover until the RLF report is fetched by a network or for 48 hours after an RLF or handover failure is detected.

The UE maintains the information for a state shift and a change of RAT, and indicates that the RLF report is valid again after returning back to LTE RAT.

In an RRC connection establishment procedure, the validity of an RLF report means that UE has experienced obstruction, such as a connection failure, and an RLF report attributable to the failure has not yet been transferred to a network. The RLF report from the UE includes the following information.

- If the last cell (in the case of an RLF) that has provided service to the UE or the E-CGI of a target for handover has not been known, a PCI and frequency information are used instead.
- The E-CGI of a cell at which re-establishment has been attempted.
- When initializing the last handover, for example, when a message 7 (an RRC connection reconfiguration) is received by the UE, the E-CGI of a cell that has provided service to the UE.
- The time that has elapsed from the initialization of the last handover to a connection failure.
- Information indicative of whether the connection failure is attributable to an RLF or a handover failure.
- Wireless measurements.
- The location of a failure.

The eNB that has received the RLF from the UE may forward the report to an eNB that had provided service to the UE prior to the reported connection failure. Wireless measurements included in the RLF report may be used to identify coverage issues as a potential cause of an RLF. Such information may be used to send events to other algorithm as input again by excluding the events from the MRO evaluation of an intra-LTE mobility connection failure.

Next, H(e)NB is described.

A mobile communication service may be provided through a base station of a mobile communication network, a private person, a specific business, or a group. The base station refers to HNB (Home NB) or HeNB (Home eNB). Hereinafter, the HNB and the HeNB generally refer to the HeNB. The HeNB is basically aimed at providing a specified service to only a Closed Subscriber Group (CSG). However, the service may be provided to other users as well as a CSG according to operation mode setting of the HeNB.

Figure 8:
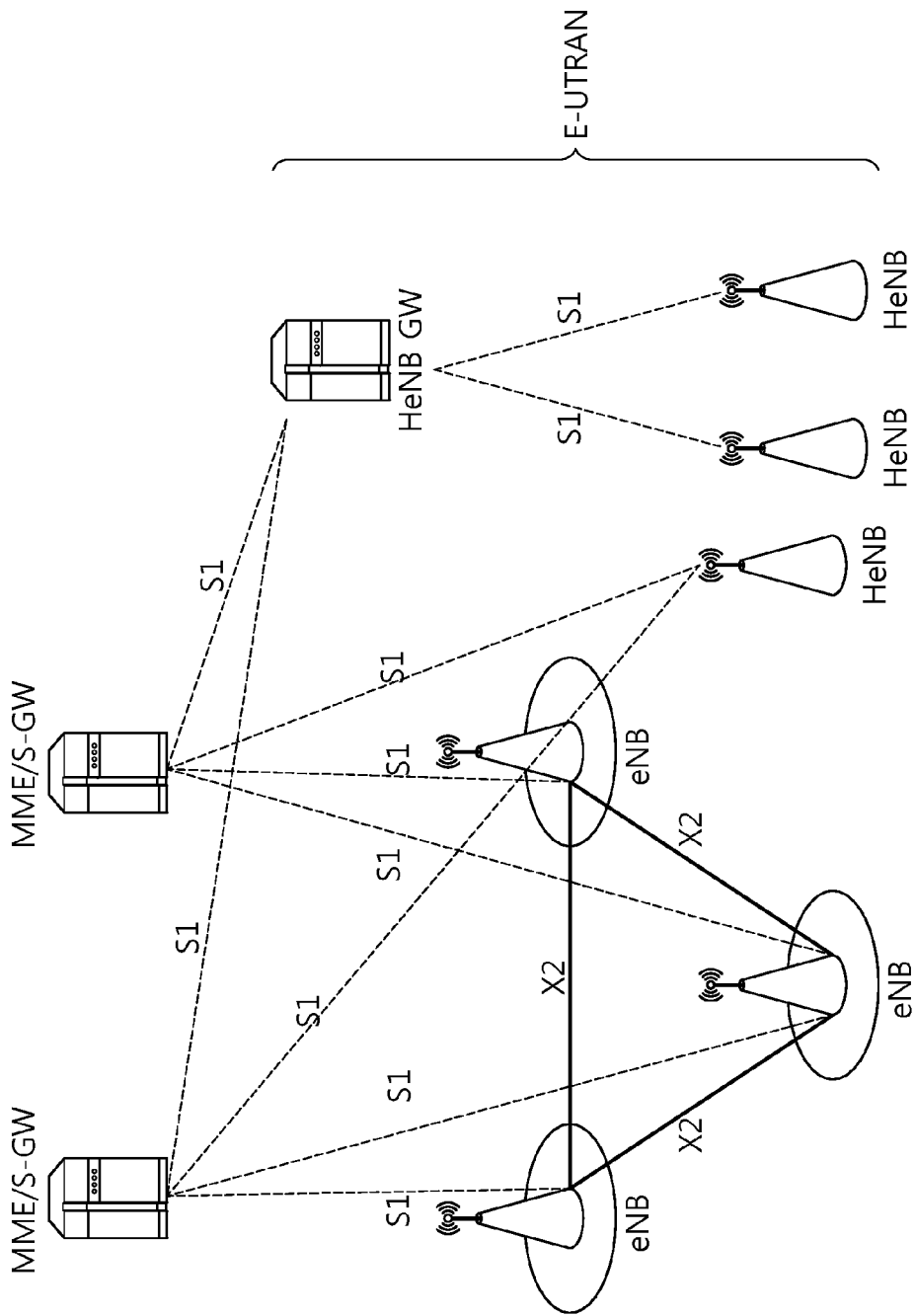
FIG. 8 is a diagram illustrating an example of a wireless communication system indicating HeNB operation.

FIG. 8 is a diagram illustrating an example of a wireless communication system indicating HeNB operation.

Referring to FIG. 8, in order to serve the HeNB as described above, a Home eNB gateway (HeNB GW) may be operated. The HeNBs are connected to an EPC through the HeNB GW or are directly connected to the EPC. The HeNB GW looks like a general eNB in the MME. The HeNB GW looks like a MME in the HeNB. The HeNB and the HeNB GW are connected to each other through an S1 interface. The HeNB GW and the EPC are connected to each other through the S1 interface. In addition, the HeNB is directly connected to the EPC by the S1 interface. A function of the HeNB is almost the same as a function of a general eNB.

In general, the HeNB has a wireless transmission output lower than that of an eNB of the mobile communication network business. Accordingly, coverage provided from the HeNB is smaller than that provided from the eNB. Because of the above characteristics, a cell provided from the HeNB is classified as a femto cell in the coverage aspect as compared with the micro cell. Meanwhile, in the provided service aspect, when the HeNB provides a service to only a CSG group, the cell provided from the HeNB refers to a CSG.

Each CSG has a unique identity. The identity refers to CSG ID (CSG identity). The terminal may have a list of CSGs which is included as a member. The CSG list may be changed by a request of the terminal or a command of a network. In general, one HeNB may support one CSG.

The HeNB transfers a CSG ID of the CSG supported from the HeNB so that only a member terminal of a corresponding CSG accesses the HeNB. When the terminal finds the CSG cell, the terminal may confirm a certain CSG by reading a CSG ID included in the system information. The terminal reading the CSG ID regards a corresponding cell as an accessible cell when the terminal is a member of a corresponding CSG cell.

The HeNB does not always need allowance of access to only CSG terminal According to setting of a configuration of the HeNB, access of a terminal which is not the CSG member may be allowed. It is changed whether to allow access to a certain terminal according to setting of a configuration of the HeNB. In this case, the setting of the configuration means setting of an operation mode of the HeNB. An operation mode of the HeNB is classified into three types according as to which terminal the service is provided as follows:

Closed access mode: Mode provided to only a specific CSG member. The HeNB provides a CSG cell.

Open access mode: Mode to provide a service a limitation being a specific CSG member like a general eNB. The HeNB provides a general cell which is not the CSG cell.

Hybrid access mode: Mode to provide a CSG service to a specific CSG member, and provide a service to a non-CSG member like a general cell. The cell is recognized as a CSG cell in the CSG member UE, and is recognized as a hybrid cell in the non-CSG member UE. Such a cell refers to a hybrid cell.

The HeNB reports whether a cell served by the HeNB is a CSG cell or a general cell so that the terminal know whether to access a corresponding cell. The HeNB operated in a closed access mode broadcasts that the HeNB is a CSG cell through system information. The HeNB operated in an open access mode broadcasts that the HeNB is not the CSG cell through the system information. In this way, the HeNB includes a CSG indicator of one bit indicating whether a cell served by the HeNB in the system information. For example, the CSG cell broadcasts by setting a CSG indicator to TRUE. If a serving cell is not a CSG cell, a method of setting the CSG indicator to FALSE or omitting transmission of the CSG indicator may be used. Since the terminal may distinguish a general cell provided from the eNB from a CSG cell, a general eNB transmits the CSG indicator so that the terminal may know that a cell type provided from the terminal is a general cell provided from the terminal. The general eNB may know that a cell type provided from the terminal is a general cell by not transmitting the CSG indicator. Table 1 indicates a CGS relation parameter by cell types transmitted from a corresponding cell. Table 2 indicates type of terminals which allows access by cell types.

TABLE 1

|  | CSG cell | General cell |
|---|---|---|
| CSG indicator | Refers to 'CSG cell' | Refers to 'Non-CSG cell' or not transmitted |
| CSG identity | Transmit supporting CSG identity | Not transmitted |

TABLE 2

|  | CSG cell | General cell |
|---|---|---|
| Terminal which does not support CSG | Access impossibility | Access possibility |
| Non-CSG member terminal | Access impossibility | Access possibility |
| Member CSG terminal | Access possibility | Access possibility |

A CSG cell and a normal macro cell may be simultaneously operated in a certain frequency. Hereinafter, such a frequency refers to a mixed carrier frequency. The network may separately reverse specific physical layer cell identities by CSG cells in a mixed carrier frequency. The physical layer cell identity refers to a physical cell identity (PCI) in an E-UTRAN system. The physical layer cell identity refers to a physical scrambling code (PSC) in an UTRAN. For the purpose of convenience or clarity, the physical layer cell identity is expressed as a PCI. The CSG cell in a mixed carrier frequency reports information on PCIs reserved for a CSG in a current frequency. The terminal receiving the above information may determine whether or not the cell is a CSG cell from a PCI of the cell when finding a certain cell in a corresponding frequency.

A terminal which does not support a CSG relation function or does not have a CSG list to which the terminal belongs is not required to be regard as a terminal capable of selecting a CSG cell in cell selection/reselection process. In this case, the terminal confirms only a PCI of a cell. If the PCI is reserved as a CSG, a corresponding cell may be directly omitted in cell selection/reselection process. In general, a PCI of a certain cell may be directly known by a terminal in a step where a physical layer confirms presence of a corresponding cell.

In a case of a terminal having a CSG list to which the terminal belongs as a member, in order to know a list with respect to peripheral CSG cells in a mixed carrier frequency, in place of confirming CSI identity of system information of all cells found in the whole PCI range, if a cell having a PCI reserved for CSG is found, the network may know that a corresponding cell is a CSG cell.

Hereinafter, a sell reselection method associated with the CSG cell is described.

The CSG cell is a sell for supporting an excellent service to a corresponding CSG member terminal. Accordingly, when a terminal serving as a CSG cell camps-on a suitable CSG cell being accessible cell as a CSG member, it is not preferable to reselect a cell of an inter-frequency on the assumption that the terminal finds an inter-frequency having a frequency priority higher than a frequency priority of a serving frequency.

When the terminal camps-on the CSG, in order to prevent non-conditional cell reselection with an inter-frequency having a frequency priority higher than the serving frequency, if a suitable CSG cell is proved as a highest rank according to a cell reselection estimation reference in a corresponding frequency, the terminal assumes that the frequency priority of a corresponding frequency is higher than other frequencies. In this way, when the terminal designates a frequency priority higher than a frequency priority designated by the network with respect to a specific frequency, such a frequency priority refers to an implicit highest priority. In this way, the network helps the terminal to be stayed in a CSG cell while protecting a rule in an existing cell selection considering the highest frequency priority when the terminal reselects the cell. If the terminal in the CSG cell reselects a non-CSG sell of a corresponding frequency, the terminal cancels assumption of implicit highest priority with respect to a corresponding frequency and uses a frequency priority value transferred from the network upon reselection estimation. If the terminal camps-on the CSG cell, when the terminal finds another CSG cell having the highest order from a frequency having the same frequency priority, the terminal depends on implementation of the terminal whether to reselect the CSG cell or to be remained in a CSG cell currently camping-on.

Inter-cell Interference Coordination (ICIC) will now be described.

The ICIC is a work to operate a radio resource to maintain control of Inter-cell Interference. An ICIC mechanism may be divided into a frequency domain ICIC and a temporal domain ICIC. The ICIC includes a multiply cell Radio Resource Management (RRM) necessary to consider information from a multiple cell.

An interfering cell is a cell to provide interference. The interfering cell refers to an aggressor cell.

An interfered cell is a cell which is affected by influence from the interfering cell. The interfered cell refers to a victim cell.

The frequency domain ICIC coordinates a use of a frequency domain resource (for example, resource block (RB)) between multiple cells.

The temporal domain ICIC coordinates a temporal domain coordinates a temporal domain resource (for example, sub-frame) between multiple cells. For the purpose of the temporal domain ICIC, Operations, Administration and Maintenance (OAM) configuration called almost blank sub-frame (ABS) pattern may be used. The ABS in the interfering cell is used to protect a resource in a sub-frame in the interference cell receiving strong inter-cell interference. The ABS is a sub-frame to have reduced transmission power (or zero transmission power) or reduced activity on a physical channel.

The pattern based on the ABS is reported to the terminal and restricts terminal measurement. This refers to measurement resource restriction. The ABS pattern means information indicating which sub-frame in at least one radio frame is an ABS.

The ABS pattern includes three measurement resource restriction patterns according to a measurement cell (for example, serving cell or neighbor cell) and a measurement type (for example, RRM (Radio Resource Management), RLM (Radio Link Measurement), and CSI (Channel State Information)).

An 'ABS pattern 1' is used for RRM/RLM measurement resource restriction of a serving cell. When setting/correction/release of the RB or MAC/PHY setting is corrected, a base station may report information on the ABS pattern 1 to the terminal.

An 'ABS pattern 2' is used for RRM measurement resource restriction of a neighbor cell operating in the same frequency as that of the serving cell. Accordingly, the ABS pattern 2 and a list of neighbor cells to be measured together with pattern information may be provided to the terminal. The ABS pattern 2 may be included in measurement setting with respect to a measurement object.

An 'ABS pattern 3' is used for resource restriction with respect to CSI measurement of the serving cell. The ABS pattern 3 may be included in a message to set CSI report.

For the purpose of the ICIC, two types of scenarios including a CSG scenario and a pico scenario are considered.

Figure 9:
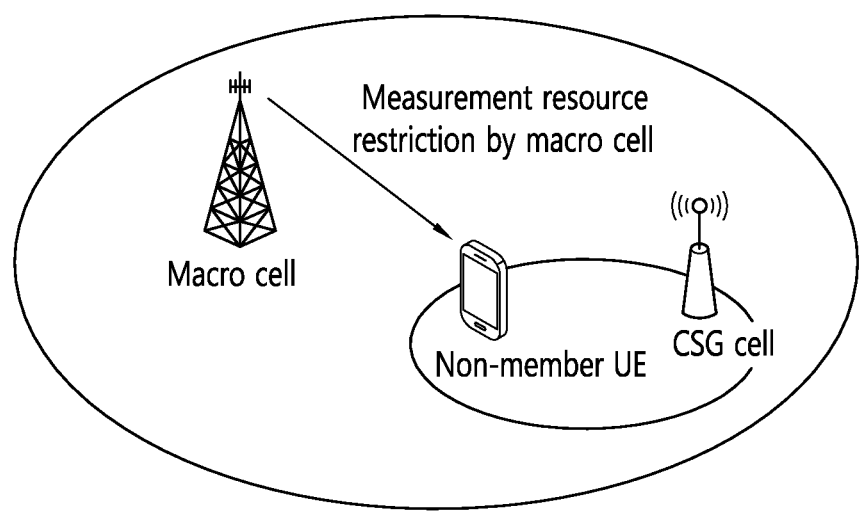
FIG. 9 illustrates the CSG scenario.

FIG. 9 illustrates the CSG scenario.

The CSG cell signifies a cell accessible by only a specific subscriber. A non-member terminal is a terminal which is not a member of a CSG cell and is not accessed by the CSG cell. A CSG cell which the terminal cannot access refers to a non-member CSG cell. The macro cell signifies a serving cell of the non-member terminal Coverage of the CSG cell partially or all overlaps with coverage of the macro cell.

When the non-member terminal is located in a close proximity of the CSG cell, a main interference condition is generated. In a side of the non-member terminal, an interfering cell serves as a CSG cell and the macro cell serves as an interference cell. The temporal domain ICIC is used so that the non-member terminal may continuously receive a service from a macro cell.

In a RRC connection state, when the network finds that the non-member terminal belongs to strong interference from the CSG cell, the network may set measurement resource restriction. Further, for the purpose of easy mobility from the macro cell, the network may set RRM measurement resource restriction with respect to a neighbor cell. If the terminal is not affected from interference longer, the network may release RRM/RLM/CSI measurement resource restriction.

The terminal may use measurement resource restriction set for RRM, RLM and CSI measurement. That is, a resource for RLM is used in the ABS, and measurement for the RLM and CSI measurement may be performed in the ABS.

The network may set not to use a low interference radio resource according to measurement resource restriction set by the CSG cell. That is, the CSG cell may not transmit or receive data from the ABS.

Figure 10:
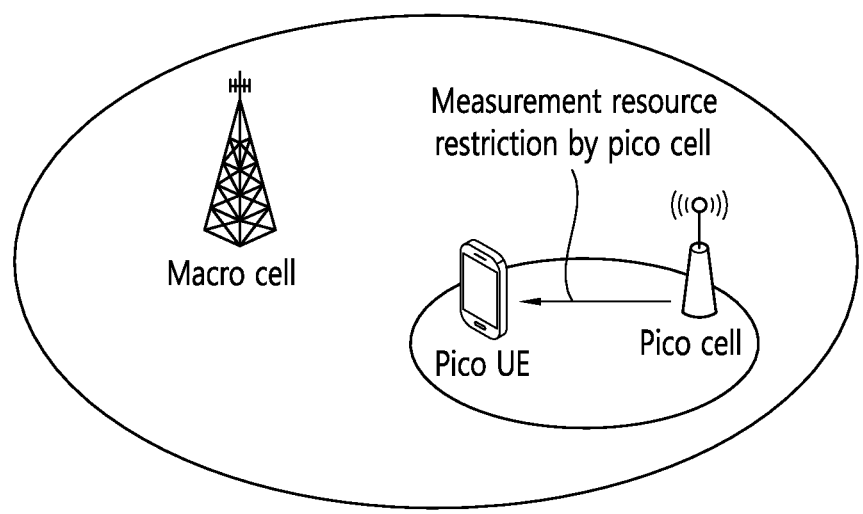
FIG. 10 illustrates a pico scenario.

FIG. 10 illustrates a pico scenario.

The pico cell is a serving cell of the pico terminal. The pico cell is a cell having a part or the whole of coverage overlapping with the macro cell. The pico cell may have coverage smaller than that of the macro cell, but the present invention is not limited thereto.

A main interference condition is generated when the pico terminal is located at an edge of a pico serving cell. In a side of the pico terminal, an interfering cell serves as a macro cell and an interference cell serves as the pico cell. The temporal domain ICIC is used so that a pico terminal may continuously receive a service from the pico cell.

When the pico cell finds that the pico terminal belongs to strong interference from the macro cell, the network may set measurement resource restriction in the terminal.

The pico terminal may use measurement resource restriction set for RRM, RLM and CSI measurement. That is, a resource for RLM is used in the ABS, and a measurement for the RLM and CSI measurement may be performed in the ABS. When the pico cell strongly interferes with the macro cell, the ABS may exactly perform RRM/RLM/CSI measurement.

Further, when the terminal using the macro cell as the serving cell performs neighbor cell measurement in the ABS, mobility from the macro cell to the pico cell may be easily performed.

The terminal performs RRM measurement such as RSRP (Reference Signal Received Power) and RSRQ (Reference Signal Received Quality) and measurement of quality such as CQI (Channel Quality Indicator), and path-loss measurement with respect to a serving cell or a neighbor cell. Further, the terminal performs measurement having RLM (Radio Link Monitoring) for monitoring connection with the serving cell as a purpose.

The ABS pattern may be implemented by a bit map having a specific length. A first bit (far left bit) corresponds to a sub-frame #0 of a radio frame satisfying SFN mod x=0 (where, SFN represents an SFN of the PCell, and x represents a size of a bit string divided by 10). A "1" indicates that a corresponding sub-frame is used for measurement. When the terminal performs the measurements using a low interference radio resource according to preset measurement resource restriction, the terminal may set only a sub-frame displayed as 1 from the ABS pattern to be used in the measurements.

In order to increase capacity of the network, a plurality of pico cells and/or femto cells may be configured in the same frequency operated by a macro cell to be operated. In the above HetNet (Heterogeneous Network) environment, in order to extend a coverage domain of the femto cell and/or the pico cell and improve service quality provided from the coverage, a method of operating the terminal to be rarely interfered may be applied by allocating and using a specific radio resource.

For example, a macro cell operates the ABS using a temporal domain ICIC scheme, interference applied to the pico cell may be minimized by the ABS. Accordingly, interference applied to the pico cell may be minimized.

If communication is performed using a resource having small resource such as the ABS, dedicated signaling between the terminal and the network may be performed a normal operation with a relatively high probability. Signaling transmitted through a common channel such as system information may not be performed. Since this is because signaling performed through the common channel has great limitation of the scheduling, it may be difficult to transmit through only a radio resource having small interference such as the ABS. Accordingly, this is because transmission is inevitably performed through another radio resource to which the interference is applied. As a result, the terminal may fail to receive the compulsory system information, and may become in a service impossible state.

When the terminal accessing the macro cell is located in a coverage edge of the pico cell or a terminal accessing the pico cell is located in an edge of corresponding pico cell coverage, downlink interference between the macro cell and the pico cell may be very great. In the above environment, the serving cell directly provides system information to the terminal through dedicated signaling so that the terminal may be prevented from becoming in service impossibility. Meanwhile, since the terminal located in a region which is rarely interfered may completely receive broadcasted system information, to provide the system information to a corresponding terminal through the dedicated signaling may consume the radio resource.

In order to support normal operation of the terminal by efficiently providing the system information to the terminal by taking into consideration the above characteristic, the serving cell needs to determine whether to normally receive system information transmitted through broadcast according to whether or not the current terminal is located in a region having strong downlink interference. However, in a current communication system, the serving cell has a difficulty in determining the above state, and particularly has a difficulty in whether to acquire a specific type of system information.

Hereinafter, an operating method for acquiring system information by the terminal will be described in order to prevent non-reception of a service due to non-reception of the compulsory system information.

Hereinafter, when the terminal is a general LTE terminal in an RRC connection state, the above compulsory information according to the present invention may include MIB, SIB1, and SIB2. When the terminal is a general LTE terminal in an RRC idle state, the above compulsory information according to the present invention may include MIB1, SIB1 to SIB8. Alternatively, the terminal for a specific service or application may require for acquiring separate system information for corresponding service or application. In this case, the specific system information type may include compulsory system information.

Figure 11:
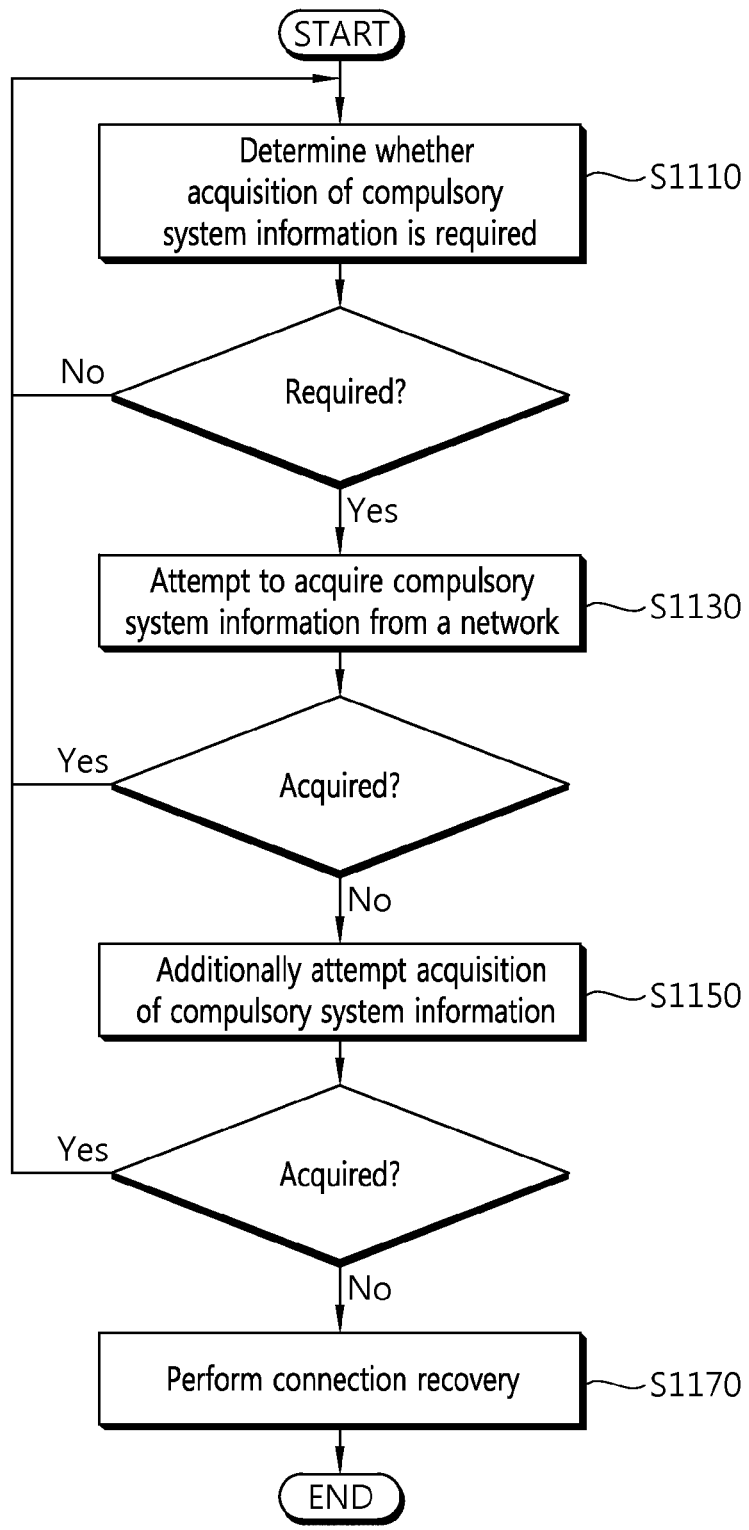
FIG. 11 is a flowchart illustrating an operating method for acquiring system information according to an embodiment of the present invention.

FIG. 11 is a flowchart illustrating an operating method for acquiring system information according to an embodiment of the present invention.

Referring to FIG. 11, a terminal determines whether acquisition of compulsory system information is required (S1110). The terminal determines whether to include valid system information or valid compulsory system information of a serving cell. Otherwise, the terminal may determine that the acquisition of the compulsory system information is required.

In a case where the terminal acquires the system information or the compulsory system from a corresponding serving cell previously, if the terminal does not acquire the broadcasted system information from the serving cell until a specific time elapses from the acquisition time, the terminal may determine that acquisition of the compulsory system information is required. For example, the specific time may be set to a maximum three hours. When the system information is not acquired from the serving cell, the terminal may determine that the acquisition of the compulsory system information is required.

When the terminal determines that the acquisition of the compulsory system information is required, the terminal attempts to acquire the compulsory system information from a network (S1130). There is no need to limit attempt of the acquisition of the compulsory system information. For example, the terminal may attempt to acquire the dedicated signaled or broadcasted system information of the serving cell from the network within a maximum specific time interval from a time when acquisition of the compulsory system information is required. Alternatively, the terminal may attempt to receive broadcasted system information from the network within the specific time interval to a specific number of times. If acquiring the system information transmitted from the network within the time interval or the number of times, the terminal may determine that the compulsory system information is normally acquired.

When attempting the compulsory system information, the terminal may drive a first timer or a first counter which is set with a specific value. The first timer may drive may be driven for a maximum time interval when the terminal may attempt to acquire the compulsory system information. The first counter may be set to a maximum number of times when the terminal may attempt to acquire broadcasted system information for acquisition of the compulsory system information. If the first timer is terminated or the first counter is terminated, the terminal may stop to acquire the compulsory system information.

Meanwhile, when the system information is periodically transmitted, the terminal may attempt to acquire the system information during a specific time interval in order to acquire broadcasted system information by the specific number of times.

If the terminal does not acquire the compulsory system information although expecting reception of the compulsory system information as described above after determining that acquisition of the compulsory system information is required, the terminal additionally attempts acquisition of the compulsory system information (S1150). To this end, the terminal transmits a system information acquisition failure report message indicating that acquisition of the system information and/or compulsory system information of the serving cell fails to the network. The system information acquisition failure report message may include information indicating a specific type of system information (e.g. MIB and/or specific SIB) in which the terminal fails to acquire.

The terminal may transmit the system information acquisition failure report message to the network, and may wait acquisition of the compulsory system information at a specific time interval.

The network may receive the system information acquisition failure report message, and may transmit the compulsory system information to the terminal through dedicated signaling. Alternatively, the network may transmit a specific type of system information which the terminal needs to acquire indicated by the system information acquisition failure report message to the terminal through the dedicated signaling. When the network provides the compulsory system information to the terminal through the dedicated signaling, the compulsory system information may be provided through a resource having minimized interference set by the network, for example, a restricted measurement resource (e.g. ABS).

The terminal may additionally attempt to acquire the compulsory system information only if a following condition is satisfied.

When the network sets a radio resource in the terminal for a restricted measurement, the network may wait to acquire the compulsory system information at a specific time interval. The radio resource for the restricted measurement may be an ABS which is a measurement subframe.

The terminal may wait to acquire the compulsory system information at a specific time interval when the network allows the above operation of the terminal through an indicator included in broadcast signaling or dedicated signaling.

The terminal may wait to acquire the compulsory system information at the specific time interval when the network acquires information indicating that the compulsory system information may be provided through the dedicated signaling.

When the terminal attempt to transmit and acquire the system information acquisition failure report message, the terminal may drive a second timer or a second counter which is set to a specific value. The second timer may be driven at a maximum time interval when the terminal may attempt to acquire the compulsory system information. The second counter may be set the maximum number of times in which the terminal may attempt to acquire broadcast system information in order to acquire the compulsory system information. If the second timer is terminated or the second counter is terminated, the terminal may stop to attempt acquisition of the compulsory system information.

If successfully acquiring the compulsory system information from the network through broadcast signaling and/or dedicated signaling during drive of the timer, the terminal may stop the second timer or stop the second counter. Next, if successfully receiving the compulsory system information through the broadcast signaling, the terminal may report the reception thereof to the network. If the network recognizes that the terminal successfully acquires the compulsory system information through the broadcast signaling, the network may not provide system information through the dedicated signaling.

The terminal may additionally attempt to acquire the compulsory system information during performing an RRC connection reestablishment process or in a situation which does not perform an RRC connection reestablishment process.

Although the terminal additionally attempts to acquire the compulsory system information, if the terminal fails to acquire the compulsory system information, the terminal performs a connection recovery process (S1170). When the terminal does not acquire the compulsory system information until the second timer is terminated or the second counter is terminated, the terminal may start the connection recovery process.

The terminal may perform the RRC connection reestablishment process as the connection recovery process. When the terminal selects a cell to transmit an RRC connection reestablishment request message, the terminal may omit a cell failing acquisition of the compulsory system information from a cell selection target for a specific time. When the terminal selects the cell, if there is a cell on a frequency except for a frequency of a cell failing acquisition of the compulsory system information, the terminal may not only omit a corresponding cell from the cell selection target but also omit a corresponding frequency from the cell selection target for a predetermined time.

The terminal may release RRC connection to enter an RRC idle state as the connection recovery process. During a process of performing cell reselection in the RRC idle state, the terminal may omit a cell failing acquisition of the compulsory system information from the cell selection target for a specific time. When the terminal selects the cell, if there is a cell on a frequency except for a frequency of a cell failing acquisition of the compulsory system information, the terminal may omit not only a corresponding cell from the cell selection target but also omit a corresponding frequency from the cell selection target for a predetermined time.

Although FIG. 11 illustrates that acquisition of the compulsory system information fails from a service cell accessed by the terminal by way of example, this is illustrative purpose only and the embodiment of the present invention is not limited thereto. The embodiment of the present invention is applicable to a case where the terminal attempts to acquire system information of another cell in order to additionally set the serving cell or according to automatic determination of the terminal or a command of the network but fails the acquisition the system information thereof.

Figure 12:
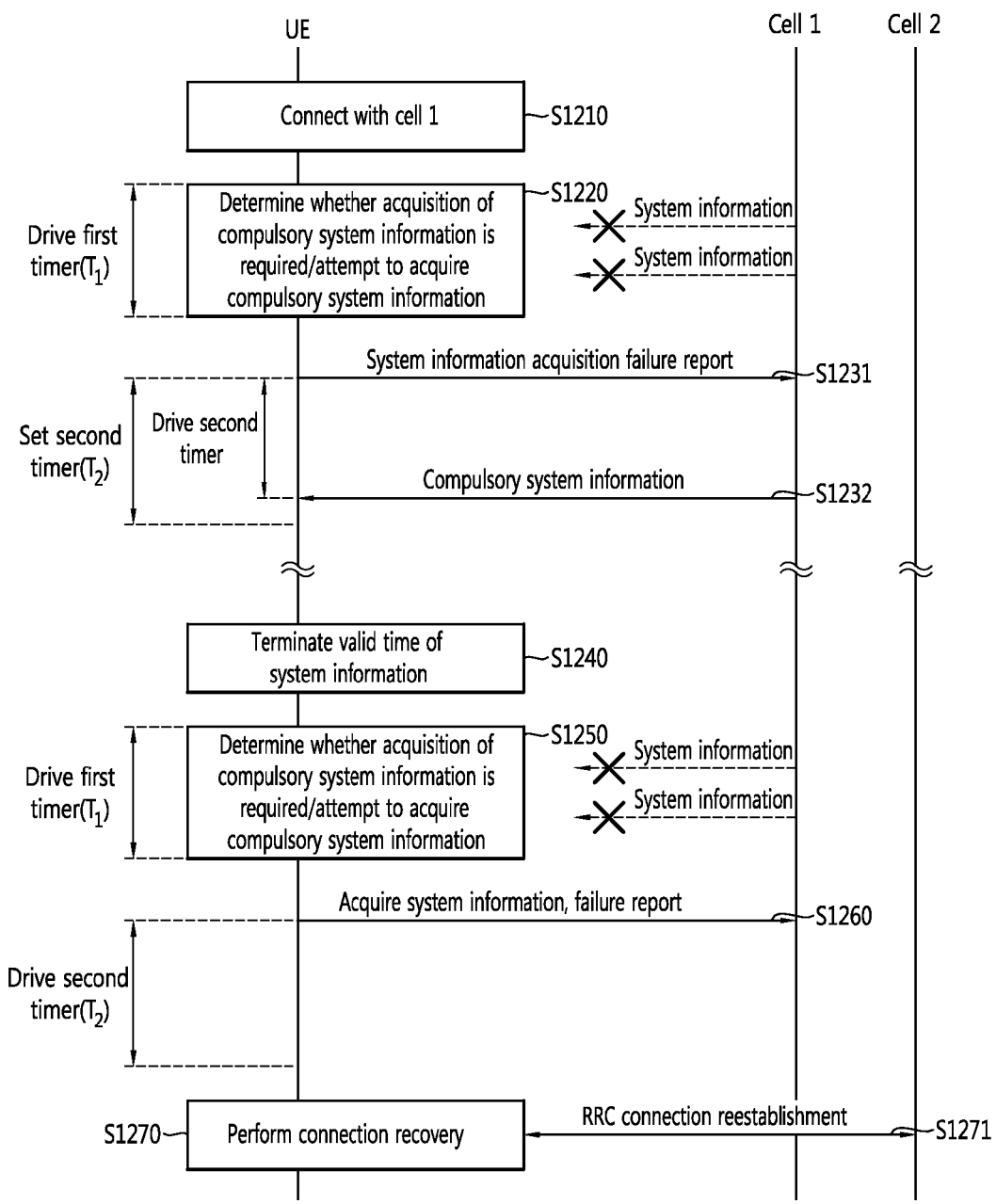
FIG. 12 is a diagram illustrating an example of an operating method for acquiring system information according to an embodiment of the present invention.

FIG. 12 is a diagram illustrating an example of an operating method for acquiring system information according to an embodiment of the present invention.

Referring to FIG. 12, the terminal connects with a cell 1 and is operated (S1210). When the terminal connects with a cell 1 to be operated, the terminal may be operated by periodically acquiring broadcasted system information. The network may be operated by setting a restricted measurement resource in the terminal. Accordingly, when the terminal connects with a cell 1 to be operated, the terminal may be performed based on the restricted measurement resource set from the network.

The terminal determines whether acquisition of the compulsory system information is required. When the terminal determines not to include valid system information of the cell 1, the terminal may determine that the acquisition of the compulsory system information is required and may attempt to acquire the compulsory system information (S1220). For example, when the terminal receives broadcasted system information from the cell 1 but does not again receive the system information until a specific time interval elapses, validity of the currently included system information may be lost. For example, the validity of the acquire system information may maintain for three hours.

Since the terminal is operated by receiving setting of the restricted measurement resource, the terminal may have a difficulty in acquiring system information which is difficulty scheduled to transmit through the corresponding radio resource. Accordingly, the terminal does not newly acquire the system information so that validity of previously acquired system information may be lost.

When the terminal determines that acquisition of the compulsory system information is required, the terminal may wait to acquire broadcasted system information from the cell 1 at a specific time interval. When the terminal determines that the acquisition of the compulsory system information is required, the terminal may drive a first timer set to $T_1$ or may drive the first counter set to $N_1$. The terminal may wait to acquire the system information until the first timer is terminated or the first counter is determined.

If the acquisition of the system information fails from the cell 1 within the specific time interval, the terminal may additionally attempt to acquire the compulsory system information. Accordingly, the terminal may start the second timer or the second counter to transmit a system information acquisition failure report message to the network (S1231). The second timer may be set to T2. The second counter may be set to N2. The system information acquisition failure report message may include information indicating that acquisition of the compulsory system information is required. The system information acquisition failure report message may include information indicating a specific type of system information required by the terminal.

The terminal may transmit the system information acquisition failure report message and may wait to acquire the compulsory system information until the second terminal is terminated or the second counter is terminated. The terminal may acquire the compulsory system information from the network during driving the timer (S1232). The compulsory system information may be transmitted from the network through dedicated signaling. The compulsory system information may be transmitted on a restricted measurement resource set from the network through the dedicated signaling.

If acquiring the compulsory system information, the terminal may stop an acquisition waiting timer. Next, the terminal may acquire broadcasted system information from the cell 1 to be operated based on the acquired broadcasted system information.

When the terminal does not again acquire the system information for a specific time after acquiring the system information from the cell 1, a valid time of the acquired system information may be terminated (S1240).

The terminal determines whether acquisition of the system information is required. Since a valid time of the acquired system information from the cell 1 is terminated, the terminal may determine that the acquisition of the compulsory system information is required and attempt to acquire the compulsory system information (S1250). When it is determined that the acquisition of the compulsory system information is required, the terminal may drive the first timer set to $T_1$ or may drive the first counter set to $N_1$. The terminal may wait to acquire the system information until the first timer is terminated or the first counter is terminated.

When acquisition of the system from the cell 1 fails at the specific time interval, the terminal may additionally attempt to acquire the compulsory system information. Accordingly, the terminal may start the second timer or the second counter and may transmit a system information acquisition failure report message to the network (S1260). The second timer may be set to $T_2$. The second counter may be set to $N_2$. The system information acquisition failure report message may include information indicating that the terminal needs to acquire the compulsory system information. The system information acquisition failure report message may include information indicating a specific type of system information required by the terminal.

The terminal may transmit the system information acquisition failure report message and may wait to acquire the compulsory system information until the second timer is terminated or the second counter is terminated.

When the terminal does not acquire the compulsory system information from the network corresponding to the system information acquisition failure report message during drive of the timer, the terminal performs a connection recovery process (S1270). In the present example, the terminal may omit a cell 1 failing acquisition of the system information and may select an RRC connection reestablishment target cell. The terminal may select a cell 2 different from the cell 1, and may recover connection by performing the RRC connection reestablishment process with a corresponding cell (S1271).

The operating method for acquiring system information in a wireless communication system may provide compulsory system information through report/request of the terminal in a network environment in which a restricted measurement resource may be set. Accordingly, the terminal may minimize a service impossible state due to the failure of the acquisition of the system information. Since the compulsory system information may be provided through dedicated signaling according to report/request of the terminal, consumption of a radio resource due to provision of imprudent compulsory system information may be prevented. Further, although acquisition of the system information by broadcasting fails, when the system information may be acquired through dedicated signaling, a situation where the terminal is separated from a cell may be prevented. Continuity of a service provided to the terminal may maintain by operating the terminal, and a network operation may be efficiently achieved.

Figure 13:
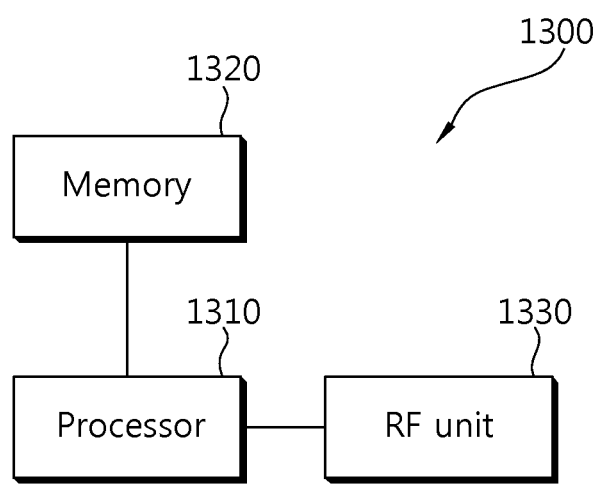
FIG. 13 is a block diagram illustrating a wireless apparatus according to an embodiment of the present invention.

FIG. 13 is a block diagram illustrating a wireless apparatus according to an embodiment of the present invention. The wireless apparatus may be implemented by a terminal and a base station for performing the operating method for acquiring system information according to the embodiment of the present invention.

Referring to FIG. 13, the wireless apparatus 1300 includes a processor 1310, a memory 1320, and a radio frequency (RF) unit 1330. The processor 1310 performs the proposed functions, processes and/or methods. The processor 1310 may be configured to determine whether acquisition of the compulsory system information is required. The processor 1310 primarily attempts to acquire the system information. If the acquisition of the system information fails, the processor 1310 may be configured to attempt acquisition of the compulsory system information transmitted through dedicated signaling. When finally failing the acquisition of the compulsory system information, the processor 1310 may be configured to perform connection recovery. The processor 1310 may be configured to implement the embodiment of the present invention with reference to FIGS. 11 and 12.

The RF unit 1830 is connected to the processor 1810, and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. An operating method for acquiring system information which is to be performed by a terminal in a wireless communication system, the method comprising:
    transmitting to a serving cell, a system information acquisition failure report message that requests the transmission of compulsory system information;
    starting a timer according to the transmission of the system information acquisition failure report message, wherein the compulsory system information is acquired before the timer is expired;
    operating a system based on the acquired compulsory system information upon the acquisition of the compulsory system information as a response to the system information acquisition failure report message; and
    performing a connection recovery upon the failure of the acquisition of the compulsory system information as a response to the system information acquisition failure report message,
    wherein if the compulsory system information is not acquired until the timer is expired, the terminal determines that the acquisition of the compulsory system information has failed,
    wherein the compulsory system information is transmitted from the serving cell through dedicated signaling, and
    wherein the terminal receives allocation of a low interference radio resource from a network to avoid interference, and the compulsory system information transmitted through the dedicated signaling is transmitted on the low interference radio resource.

2. The operating method of claim 1, further comprising:
    stopping the timer when acquiring the system information or the compulsory system information from the serving cell during duration of the timer.

3. The operating method of claim 1, further comprising:
    attempting to acquire broadcasted system information from the serving cell,
    wherein the system information acquisition failure report message is transmitted when the terminal does not acquire the broadcasted system information from the serving cell.

4. The operating method of claim 1, wherein the performing of the connection recovery comprises performing a radio resource control (RRC) connection reestablishment process with a selected cell.

5. The operating method of claim 4, wherein the selected cell is a cell different from the serving cell.

6. The operating method of claim 4, wherein the selected cell is a cell which is operated in a frequency different from a frequency of the serving cell.

7. The operating method of claim 1, wherein the performing of the connection recovery comprises releasing connection with the serving cell and entering a Radio Resource Control (RRC) idle state.

8. The operating method of claim 1, wherein the compulsory system information comprises a master information block (MIB), a system information block 1 (SIB1), and a system information block 2 (SIB2) among the system information of the serving cell.

9. A wireless apparatus operating in a wireless communication system, the wireless apparatus comprises:
    a Radio Frequency (RF) unit that sends and receives radio signals; and
    a processor that is functionally coupled to the RF unit and operates,
    wherein the processor is configured to
    transmit to a serving cell, a system information acquisition failure report message that requests the transmission of compulsory system information;
    start a timer according to the transmission of the system information acquisition failure report message, wherein the compulsory system information is acquired before the timer is expired;
    operate a system based on the acquired compulsory system information upon the acquisition of the compulsory system information as a response to the system information acquisition failure report message; and
    perform a connection recovery upon the failure of the acquisition of the compulsory system information as a response to the system information acquisition failure report message,
    wherein if the compulsory system information is not acquired until the timer is expired, the apparatus determines that the acquisition of the compulsory system information has failed,
    wherein the compulsory system information is transmitted from the serving cell through dedicated signaling, and
    wherein the apparatus receives allocation of a low interference radio resource from a network to avoid interference, and the compulsory system information transmitted through the dedicated signaling is transmitted on the low interference radio resource.

* * * * *